US006749118B2

(12) United States Patent
Kobayashi et al.

(10) Patent No.: US 6,749,118 B2
(45) Date of Patent: Jun. 15, 2004

(54) AUTOMATIC TICKET GATE APPARATUS

(75) Inventors: Takashi Kobayashi, Kanagawa-ken (JP); Yoshinori Muraoka, Saitama-ken (JP); Hisashi Yoshida, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/793,890

(22) Filed: Feb. 28, 2001

(65) Prior Publication Data

US 2001/0017585 A1 Aug. 30, 2001

(30) Foreign Application Priority Data

Feb. 29, 2000 (JP) ....................................... 2000-054636

(51) Int. Cl.[7] ................................................ G06K 7/08
(52) U.S. Cl. ....................................... 235/449; 235/384
(58) Field of Search ................................ 235/384, 380, 235/382, 449, 492; 705/13

(56) References Cited

U.S. PATENT DOCUMENTS

| | | | | | |
|---|---|---|---|---|---|
| 4,496,830 | A | * | 1/1985 | Yoshihara et al. | 235/458 |
| 5,397,883 | A | * | 3/1995 | Miyashita | 235/380 |
| 5,414,249 | A | * | 5/1995 | Matsumoto | 235/380 |
| 5,740,369 | A | * | 4/1998 | Yokozawa et al. | 235/382 |
| 5,754,654 | A | * | 5/1998 | Hiroya et al. | 705/75 |
| 5,831,547 | A | * | 11/1998 | Ohtsuki et al. | 235/384 |
| 5,877,484 | A | * | 3/1999 | Hirose | 235/375 |
| 5,939,696 | A | * | 8/1999 | Kleppa | 337/152 |
| 5,969,332 | A | * | 10/1999 | Ueda et al. | 235/492 |
| 6,070,146 | A | * | 5/2000 | Mimata | 232/18 |
| 6,073,836 | A | * | 6/2000 | Kleppa | 235/375 |
| 6,450,404 | B1 | * | 9/2002 | Imazuka | 235/381 |
| 2001/0017317 | A1 | * | 8/2001 | Ishigame et al. | 235/384 |

FOREIGN PATENT DOCUMENTS

| | | | | | |
|---|---|---|---|---|---|
| JP | 53030399 | A | * | 3/1978 | G07B/15/04 |
| JP | 03198186 | A | * | 8/1991 | G07B/11/00 |
| JP | 05165857 | A | * | 7/1993 | G06F/15/21 |
| JP | 06243314 | A | * | 9/1994 | G07B/15/00 |
| JP | 08087622 | A | * | 4/1996 | G07B/11/02 |
| JP | 09115015 | A | * | 5/1997 | G07B/15/00 |
| JP | 10124710 | A | * | 5/1998 | G07B/15/00 |
| JP | 10149468 | A | * | 6/1998 | G07B/15/00 |
| JP | 10334288 | A | * | 12/1998 | G07B/15/00 |
| JP | 2000044076 | A | * | 2/2000 | B65H/3/52 |
| JP | 2000057388 | A | * | 2/2000 | G07B/11/02 |
| JP | 2000132720 | A | * | 5/2000 | G07B/15/00 |
| JP | 2000251097 | A | * | 9/2000 | G07B/15/00 |
| KR | 2002028750 | A | * | 4/2002 | G07B/15/00 |

* cited by examiner

*Primary Examiner*—Michael G. Lee
*Assistant Examiner*—Uyen-Chau N. Le
(74) *Attorney, Agent, or Firm*—Pillsbury Winthrop LLP

(57) ABSTRACT

An automatic ticket gate apparatus comprising a box defining the passage for ticket checking and a communicating face inclined to the horizontal to the side of passage, which is provided on the top of box and is provided with a wireless communicator communicating with a wireless ticket, and a ticket checking unit, which performs the ticket checking process basing upon the result of communication with a wireless ticket through the wireless communicator.

6 Claims, 8 Drawing Sheets

MAGNETIC TICKET IS DELIVERED WITH A SIDE OF MAGNETIC TICKET IN PARALLEL TO THE COMMUNICATING FACE

MAGNETIC TICKET IS DELIVERED WITH A SIDE OF MAGNETIC TICKET IN NON-PARALLEL TO THE COMMUNICATING FACE

AUTOMATIC TICKET GATE APPARATUS

BACKGROUND OF THE INVENTION

1. Field of the Invention

The present invention relates to an automatic ticket gate apparatus, which are installed at entrance and exit gates of stations and a like of transportation facilities including railways.

2. Description of the Related Art

In these years automatic ticket gate apparatus are installed at stations of transportation facilities including railways. The automatic ticket gate apparatus receive and transfer the magnetic tickets inserted by users and read out information magnetically recorded on tickets and return the tickets at the take-off port in the forwarding side of the apparatus. Propriety of passage (entrance to station premises or exit from station premises) of users is judges and when the passage in permitted, a gate is opened to allow passage. When passage is not permitted, the gate is closed to prevent the passage of the user. Also, guidance such as cautions is displayed at a display panel mounted on the top cover of apparatus, or outputted by a speaker.

Furthermore, this kind of automatic ticket gate apparatus are provided with a wireless communication function and execute similar judgement of passage for wireless ticket and controls the passage of users.

As described in the above, in case of automatic ticket gate apparatus of prior art, as only one-way passage of users (for example entrance passage) can be controlled, a pair of two automatic ticket gate apparatus must be installed in order to form an entrance lane and a ticket collecting lane. Therefore, as two each of automatic ticket gate apparatus must be installed between the respective passages (two each of apparatus must be installed at boundary of passage), it was a problem that the automatic ticket gate apparatus occupy a considerable large space at the ticket-checking corner.

SUMMARY OF THE INVENTION

An object of the present invention is to reduce the space for installing automatic ticket gate apparatus sharply and to provide automatic ticket gate apparatus that can prevent erroneous presentation of a wireless ticket to ticket gate apparatus.

In accordance with the present invention automatic ticket gate apparatus can be provided, comprising a main body defining a passage for ticket checking; a wireless communicating face inclined from horizontal toward the passage, which is provided on the top of the main body and which is provided with a wireless communicator which communicates with a wireless ticket carried by a passenger passing the passage; and ticket checking means for checking ticket information communicated with the wireless ticket through the wireless communicator, the wireless ticket being carried by the passenger.

DETAILED DESCRIPTION OF THE PREFERRED EMBODIMENTS

Figure 1:
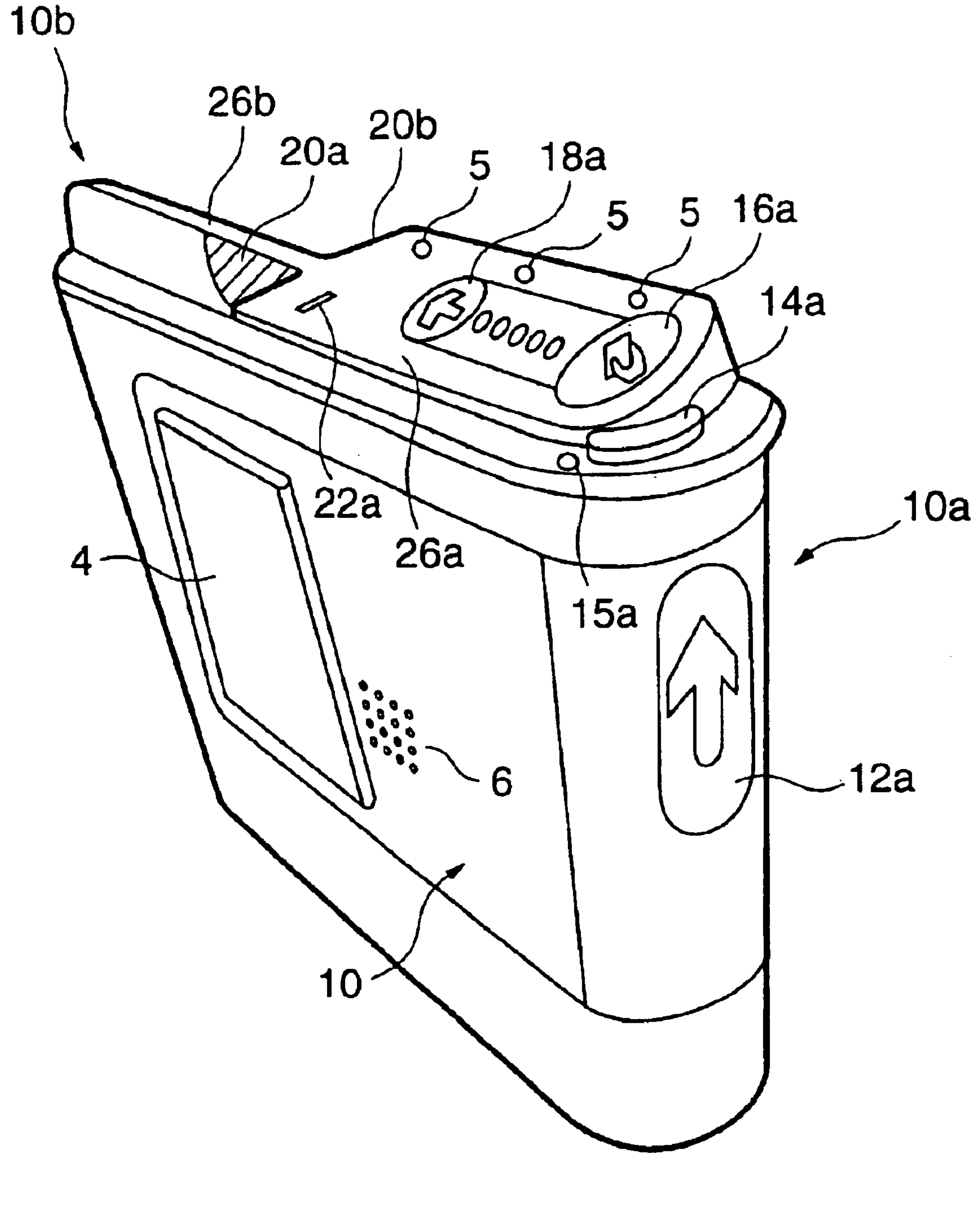
FIG.1 is a perspective illustration showing the outline of outlook of automatic ticket gate apparatus in accordance with the present invention.

The tickets that are processed by the ticket gate apparatus of the present invention, are magnetic tickets and wireless tickets. Furthermore, magnetic tickets are limited to one size. Wireless tickets shall cover the tickets of different sizes from the magnetic tickets that are limited to one size.

For example, magnetic tickets, which shall be processed by the automatic ticket gate apparatus of the present invention, shall be limited to Edomondson size (57.5 mm×30 mm). Furthermore, the magnetic tickets, which are to be processed by the apparatus, shall be limited to the tickets available only in the issued date as the tickets for a certain short distance. In the other words, the magnetic tickets shall be limited to the normal tickets only. Also as the wireless tickets, which are to be processed by the automatic ticket gate apparatus, season-tickets (Passes), which allow the transportation in a certain period and for a certain section (57.5 mm×85 mm), prepaid ticket such as Stored Fare Tickets, which allow the transportation against the information regarding the sum of money registered in the ticket in advance, and tickets for long distance (Long distance tickets), which allow long transportation exceeding the aforementioned certain distance (57.5 mm×120 mm), can be mentioned.

As described in the above, the volume of the data can be limited by limiting the kinds of the magnetic tickets (by limiting the use to the normal tickets only), and therefore the volume of the data to be recorded in the magnetic tickets can be limited, and as the result, the size of the magnetic tickets can be also unified to Edomondson size only. Though the method is different from this system, magnetic tickets can be unified to the Edomondson size only by changing the recording system. For example, FM-System, which is of high recording density and does not require CP truck (Clock Pulse), can be adopted, while NRZ 1 System (Non return to zero one), which is of low recording density, is abandoned. Even in the case of magnetic tickets of Edomondson size, relatively large volume of data can be stored. As the result, long distance tickets involving the information of the super express ticket can be issued as magnetic tickets of Edomondson size.

Hereinafter, examples of the embodiments of the present invention are described by referring to the drawings.

Figure 2:
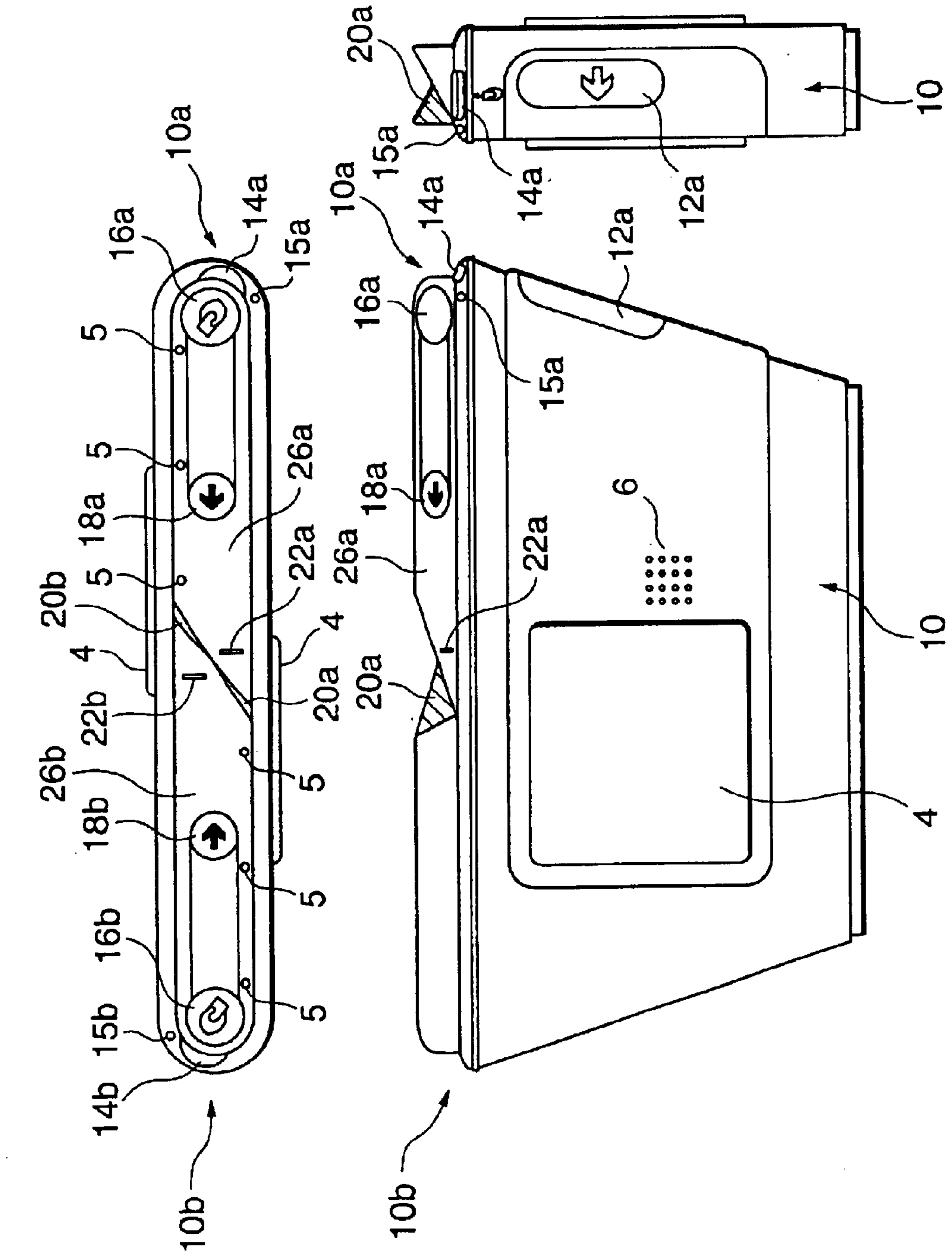
FIG. 2 is a drawing showing top view, side view and elevational view of automatic ticket gate apparatus in accordance with the present invention.
Figure 3:
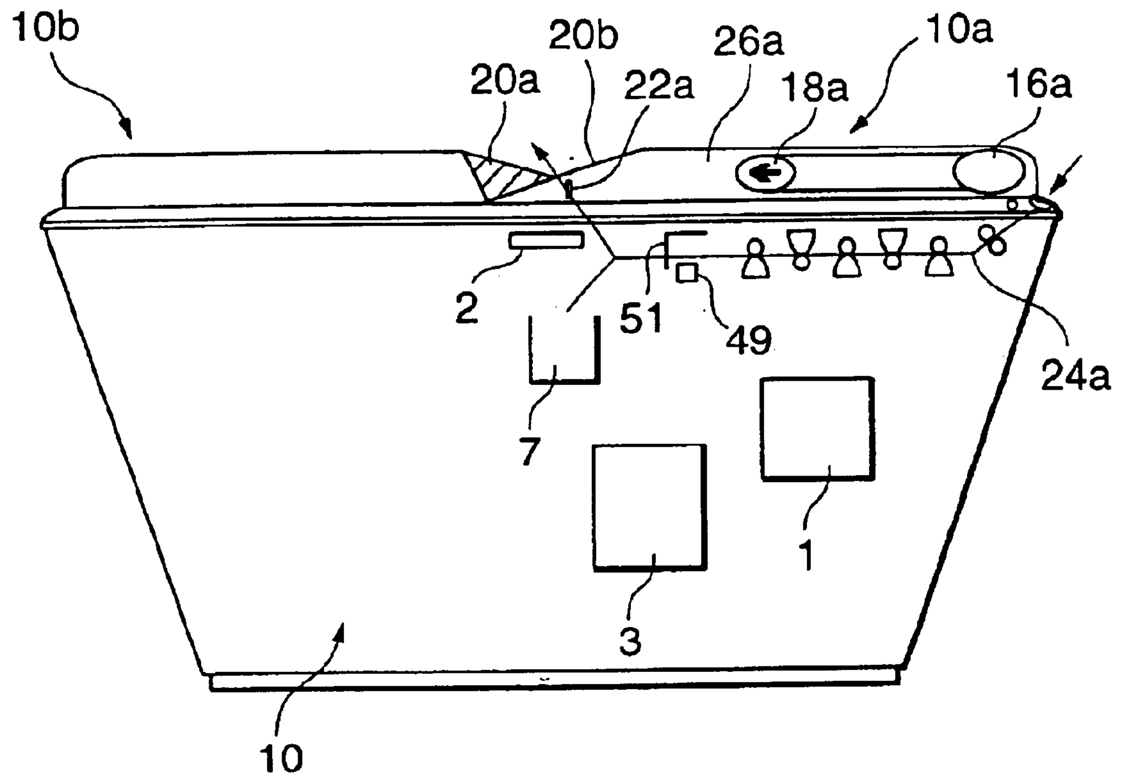
FIG. 3 is a sectional drawing showing the outline of the inside construction (transfer path etc.) of the automatic ticket gate apparatus in accordance with the present invention.

FIG. 1 is a perspective illustration showing the outline of outlook of an automatic ticket gate apparatus in accordance with the present invention. FIG. 2 is a drawing showing top view, side view and elevational view of the automatic ticket gate apparatus in accordance with the present invention. FIG. 3 is a sectional drawing showing the outline of the inside construction of the automatic ticket gate apparatus of the present invention. As seen in FIG. 1 to FIG. 3, an automatic ticket gate apparatus comprises a main controller 1, a control panel for maintenance 2, a power source unit 3, a door 4, a human monitoring sensor unit 5, a speaker 6, a ticket collector 7, a ticket checking processor 10*a*, and a ticket collecting processor 10*b* and a like.

The main controller 1 performs the control of the whole automatic ticket gate apparatus. The control panel for maintenance 2 is the panel, which is operated by the staff-member in charge of maintenance of the automatic ticket gate apparatus. The power source unit 3 supplies with current to the respective parts of the automatic ticket gate apparatus. The door 4 closes the passage by closing the door. The door 4 is driven by the door opening/closing drive 4*a*. The human monitoring sensor unit 5 is to detect the user, who passes on the side of the automatic ticket gate apparatus, in other words, the users who pass through the ticket checking passage. The speaker 6 is to output various information to the users. The ticket collector 7 is equipped with a collecting box, in which used magnetic tickets are collected.

The ticket checking processor 10*a* comprises a processor. In other words, the ticket checking processor 10*a* comprises a passage display 12*a*, an insert port 14*a*, a fare adjustment key 5*a*, a wireless communicator 16*a*, a guidance display 18*a*, a checking result display 20*a*, a take-out port 22*a* and a conveying mechanism 24*a*. The passage display 12*a* indicates various guidance to the user, who passes through the passage along the automatic ticket gate apparatus. The insert port 14*a* is to receive the magnetic ticket inserted by the user. The fare adjustment key 15*a* is to instruct a fare adjustment to the main body of the apparatus, when a fare adjustment is required. The wireless communicator 16*a* is to communicate with the wireless tickets, which is held up by users, to receive the data sent by the wireless ticket or to send data to the wireless tickets. The guidance display 18*a* is to display various guidance to the users. The checking result indicating display 20*a* is to indicate the checking result. For example, when the passage is allowed, a blue lamp lights up and when the passage is rejected, a red lamp lights up. Furthermore, the checking result indicating display 20*a* may be equipped with a display by means of letters. The ticket take-out port 22*a* is to deliver the magnetic ticket that has been received at the insert port 14*a*. In other words, the magnetic ticket is returned to the user. The conveying mechanism 24*a* is to transfer the magnetic ticket that is received at the insert port 14*a* to the take-out port 22*a*.

The ticket collecting processor 10*b* comprises a processor. In other words, the ticket collecting processor 10*b* comprises a passage display 12*b*, an insert port 14*b*, a fare adjustment key 15*b*, a wireless communicator 16*b*, a guidance display 18*b*, a checking result display 20*b*, a take-out port 22*b* and a conveying mechanism 24*b*. The passage display 12*b* indicates various guidance to the user, who passes through the passage along the automatic ticket gate apparatus. The insert port 14*b* is to receive the magnetic ticket inserted by the user. The fare adjustment key 15*b* is to instruct a fare adjustment to the main body of the apparatus, when a fare adjustment is required. The wireless communicator 16*b* is to communicate with the wireless tickets, which is held up by users, to receive the data sent by the wireless ticket or to send data to the wireless tickets. The guidance display 18*b* is to display various guidance to the users. The checking result indicating display 20*b* is to indicate the checking result. For example, when the passage is allowed, a blue lamp lights up and when the passage is rejected, a red lamp lights up.

Furthermore, the checking result indicating display 20*b* may be equipped with a display by means of letters. The ticket take-out port 22*b* is to deliver the magnetic ticket that has been received at the insert port 14*b*. In other words, the magnetic ticket is returned to the user. The conveying mechanism 24*b* is to transfer the magnetic ticket that is received at the insert port 14*b* to the take-out port 22*b*, or to the ticket collector 7. Meantime, instead of providing a ticket take-out port 22*b* at the ticket collecting processor 10*b*, al the tickets received at the insert port 14*b* may be collected by the ticket collector 7.

The conveying mechanism 24*a* provided as a part of the ticket checking processor 10*a* is covered by a top cover 26*a*. This top cover 26*a* is mounted on the automatic ticket gate apparatus allowing to be opened and closed freely. On the top cover 26*b*, there are provided with an insert port 14*a*, a wireless communicator 16*a*, a guidance display 18*a*, a checking result indicating display 20*a* and a take-out port 22*a*. Similarly, a top cover 26*b* covers the conveying mechanism 24*b* as a part of the ticket collecting processor 10*b*. This top cover 26*b* is mounted on the automatic ticket gate apparatus allowing to be opened and closed freely. On the top cover 26*b*, there are provided an insert port 14*b*, a wireless communicator 16*b*, a guidance display 18*b* and a checking result indicating display 20*b*.

The one top cover 26*a* is so composed that it can be opened toward the one side passage separated by the automatic ticket gate apparatus and the top cover 26*b* is so composed that it can be opened toward the other side passage separated by this automatic ticket gate apparatus. By such an arrangement, even when the top cover on one side is opened and one passage is closed, the other side passage can be still used.

The main body of the said automatic ticket gate apparatus (box 10) defines the ticket checking and collecting passage and the top covers 26*a* and 26*b* are mounted on the box 10. As described in the above, the top cover 26*a* is provided with a wireless communicator 16*a* so that it functions as the communication face. Similarly, the top cover 26*b* is also provided with a wireless communicator 16*b* and functions as a communicating face. These communicating faces are inclined from the horizontal toward the respective passages.

In this connection, the inclination of the wireless communicating faces is described more precisely. Th main body of the automatic ticket gate apparatus defines the first passage and the second passage for ticket checking and collecting and is installed between the both passages. For example, the top cover 26*a* as a wireless communicating face is provided from one end almost to the center of the box 10 on the top, and is inclined from the horizontal toward the first passage. A ticket checking process is performed for the user who advances toward the first direction on the first passage from one end to the other end of the box 10 of the automatic ticket gate apparatus, basing upon the ticket data obtained from the wireless ticket through the wireless communicator 16*a* provided on the top cover 26*a*.

On the contrary, the top cover 26*b* as the communicating face is provided from the other end almost to the center of the box 10 on the box and is inclined from the horizontal toward the second passage. A ticket checking process is performed for the person who advances reversibly toward the second direction on the second passage from the other end to one end of the box 10 of the automatic ticket gate apparatus, basing upon the ticket data obtained from the wireless ticket through the wireless communicator 16*b* provided on the top cover 26*b*.

As described in the above, by having the top covers 26*a* and 26*b* inclined toward the respective passages, the users can hold up the wireless ticket to the wireless communicators 16a and 16b in a natural posture. Similarly, the users can confirm the content indicated in the guidance indicating displays 18a and 18b in natural posture.

Also, on the side face supporting the inclination of the top cover 26b protruding against the top cover 26a, which functions as a communicating face, there is provided a checking result indicating display 20a. Similarly, on the side surface supporting the inclination of the top cover 26a protruding against the top cover 26b, which functions as a communicating face, there is provided a checking result indicating display 20b. As the checking result indicating display 20b is provided on the protruding portion over the top cover 26b, an excellent visual recognition can be allowed. Similarly as the checking result indicating display 20b is provided on the protruding portion of the top cover 26a an excellent visual recognition can be allowed. Also, as the checking result indicating display 20a protrudes over the top cover 26a, it can be protected that the wireless tickets held up to the wireless communicator 16a is held up to the wireless communicator 16b successively. In other words, the checking result indicating display 20a plays a role that it shelters the wireless ticket held up to the wireless communicator 16a. Similarly, as the checking result indicating display 20b protrudes over the top cover 26b, it can be protected that the wireless tickets held up to the wireless communicator 16b is held up to the wireless communicator 16a successively. In other words, the checking result indicating display 20b plays a role that it shelters the wireless ticket held up to the wireless communicator 16b.

Figure 4A:
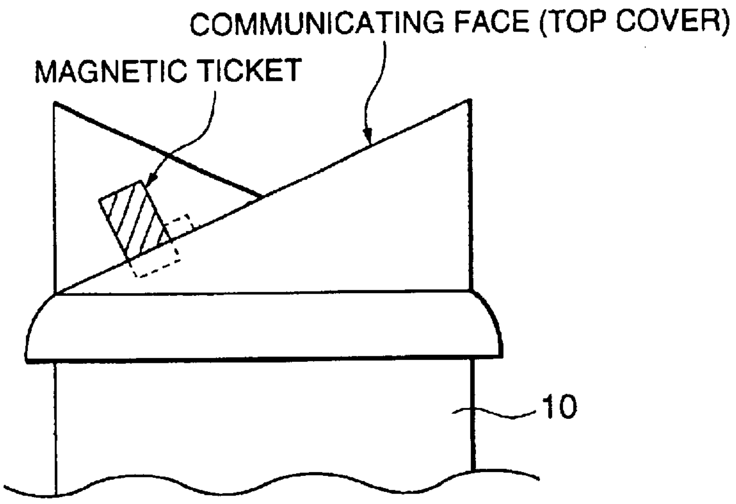
FIG. 4 is a drawing showing the delivery angle of the magnetic ticket.
Figure 4B:
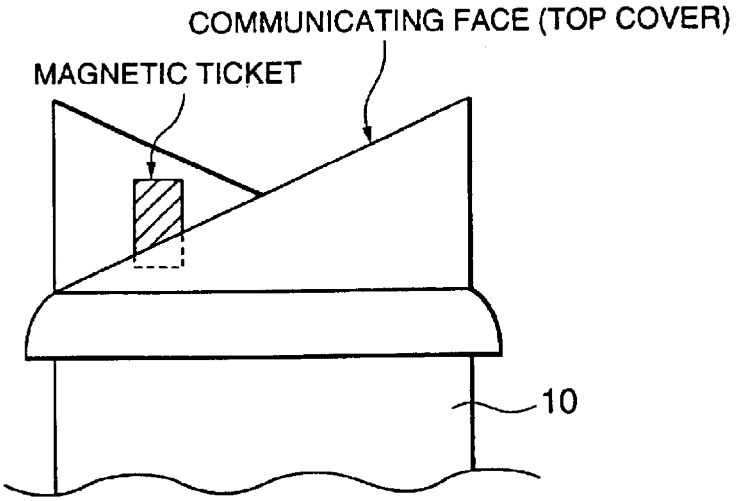

Next, the delivery angle of the magnetic ticket is described by referring to FIG. 4. For example, in case of the automatic ticket gate apparatus of the present invention, a magnetic ticket can be delivered at a delivery angle as shown in FIG. 4A. That is, the magnetic ticket is received and transferred horizontally in the apparatus and at the same time the magnetic ticket is turned to the direction crossing to the communication face and transferred to meet the inclination of the communicating face. Also, a magnetic ticket can be delivered at a delivery angle shown in FIG. 4B. In case of FIG. 4A, the magnetic ticket is delivered, while a side of the ticket is kept parallel to the top cover as the communicating face. In case of FIG. 4B, the magnetic ticket is delivered, while the side of the magnetic ticket crossing to the transfer direction is kept non-parallel to the top cover as the communicating face. In the former case, the arrangement allows to have the user take out the magnetic ticket, without forcing the user to take an unnatural posture.

Figure 5:
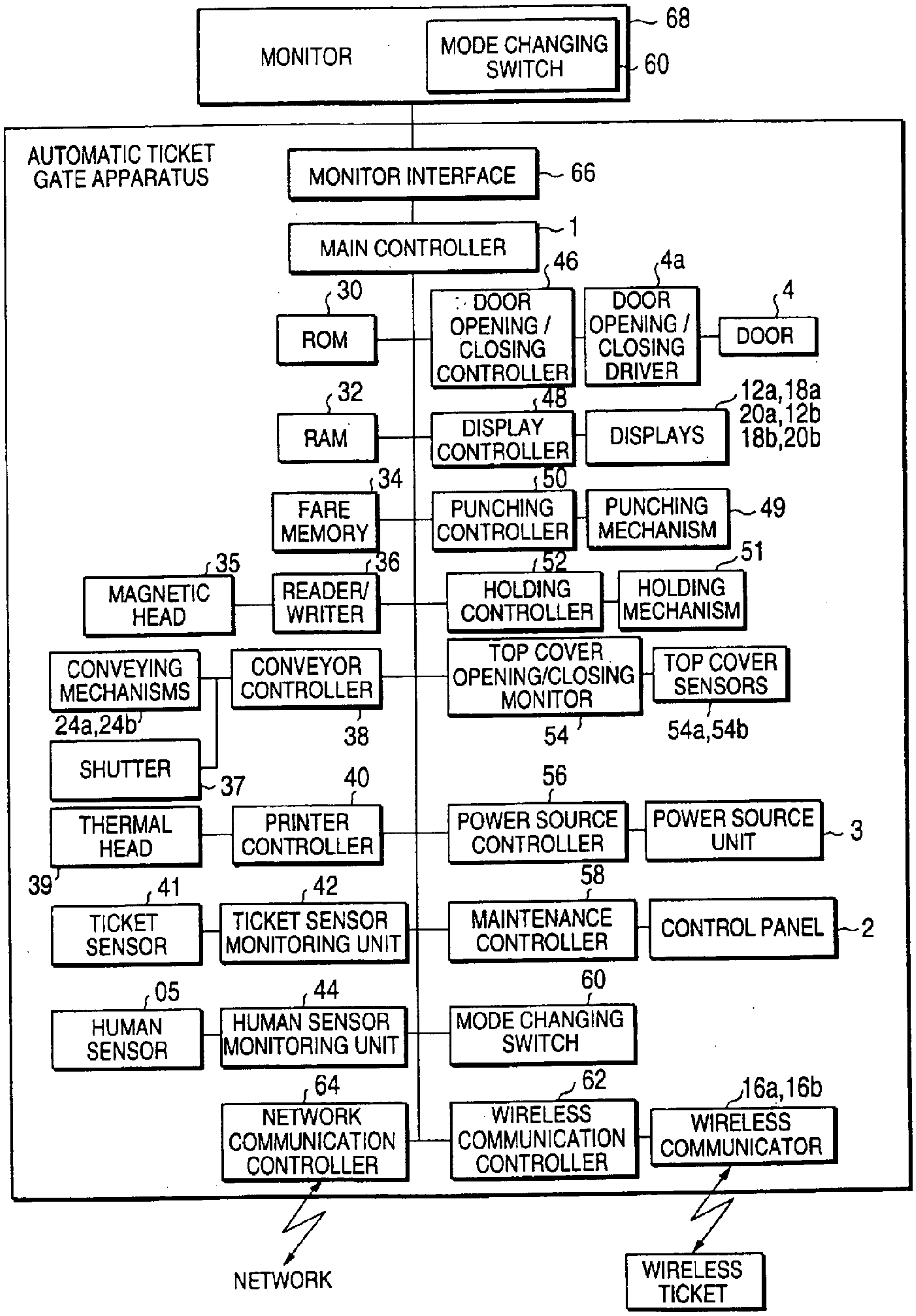
FIG. 5 is a block diagram showing the schematic constitution of the ticket gate apparatus in accordance with the present invention.

Next, the movement of the ticket gate apparatus of the present invention is described by referring to FIG. 5. FIG. 5 is a block diagram showing the schematic constitution of the ticket gate apparatus in accordance with the present invention. As shown in FIG. 5, a ticket gate apparatus of the present invention comprises a main controller 1, a ROM 30, a RAM 32, a fare memory 34, a reader/writer 36, a conveyer controller 38, a printer controller 40, a ticket sensor monitoring unit 42, a human sensor monitoring unit 44, a door opening/closing controller 46, a display controller 48, a punching controller 50, a holding controller 52, a top cover opening/closing monitor 54, a power source controller 56, a maintenance controlling panel controller 58, a mode changing switch 60, a wireless communication controller 62, as network communication controller 64, a monitor interface 66 and a like.

As described in the above, the main controller 1 performs the whole control of the automatic ticket gate apparatus. The ROM 30 memories the control program for the main controller 1. The RAM 32 memories temporarily the data arising at the time of controlling the automatic ticket gate apparatus by the main controller. The fare memory 34 memories the data of the fares. The reader/writer 36 controls the magnetic head for reading and recording to read out the data stored magnetically in the magnetic ticket and record magnetically the specified data in the magnetic ticket. The conveyer controller 38 performs the control of the transfer of the magnetic ticket by the conveying mechanisms 24a and 24b. This conveyer controller 38 controls the shutters 37 provided at the insert ports 14a and 14b to prohibit the insertion of the magnetic ticket. The printer controller 40 controls the thermal head 39 to print the specified data in the magnetic ticket.

The ticket monitoring sensor unit 42 checks the signals detected from a plurality of ticket sensors 41 provided along the conveying mechanism 24a and 24b and monitors the transfer situation of the magnetic ticket by the conveying mechanisms 24a and 24b. The human sensor monitoring unit 44 checks the human detecting signals from the human detecting sensor 5 to monitor the passerby along the automatic ticket gate apparatus. The door opening/closing controller 46 controls the drive for opening and closing the door 4. The display controller 48 controls the display of the various displays such as a passage display 12a, a guidance display 18a, a checking result indicating display 20a, a passage display 12b, a guidance display 18b, a checking result indicating display 20b and a like. The punching controller 50 controls the timing for punching and a like by the punching mechanism 49 provided at a certain position along the conveying mechanisms 24a and 24b. The holding controller 52 performs the holding of the magnetic ticket by the holding mechanism 51 provided at a certain position along the conveying mechanisms 24a and 24b. The top cover opening/closing monitor 54 checks the detecting signals from the top cover sensor 54a that detects the opening/closing state of the top cover 26a and from the top cover sensor 54b that detects the opening/closing state of the top cover 26b to monitor the opening/closing state of the top covers 26a and 26b. The power source controller performs the control of the power supply by the power source unit 3.

The maintenance controlling panel controller 58 performs the control of the automatic ticket gate apparatus basing upon the settings inputted by the control panel for maintenance 2. The maintenance controlling panel controller 58 performs also the switching subject for the maintenance by means of the control panel for maintenance. For example, in the state that the top cover 26a only is open (the opening/closing state of the top cover is monitored by the top cover opening/closing monitor 54, the maintenance controlling panel controller 58 switches the object for maintenance by the control panel for maintenance to the ticket collecting processor 10b. Furthermore, in the state that the both top covers 26a and 26b are open, the maintenance controlling panel controller 58 switches the object for maintenance by the control panel for maintenance 2 to the both ticket checking processors 10a and 10b.

The mode-changing switch 60 switches the mode for the automatic ticket gate apparatus. As the modes, a magnetic mode, a wireless mode and a combination mode are provided. When the machine is switched to the magnetic mode by the mode changing switch 60, the objects of the ticket checking process and the ticket collecting process becomes magnetic tickets only. In this case, the passage displays 12a and 12b indicate that the magnetic tickets only are objects of the process. In such a case, even effective wireless ticket is not allowed for the passage. When the mode is switched to the wireless mode by means of mode-changing switch 60, the objects of ticket checking and collecting processes becomes wireless tickets only. In this case, the guidance displays 12*a* and 12*b* indicate that the wireless tickets only are the objects of the process. Furthermore, the insert port shutters provided at the insert ports 14*a* and 14*b* are closed so that magnetic ticket cannot be inserted into the insert ports 14*a* and 14*b*. When the mode is switched to the combination mode by the mode changing switch 60, the object of the ticket processing and collecting process become both magnetic tickets and the wireless tickets. In this case, the passage displays 12*a* and 12*b* indicate that both magnetic tickets and wireless tickets are the object of the process.

The wireless communication controller 62 performs the control of the receiving power of the wireless communicators 16*a* and 16*b*, the demodulation of the data received at the wireless communicators 16*a* and 16*b* and the modulation of the data to be transmitted from the wireless communicators 16*a* and 16*b*. The network communication controller 64 performs the control the communication with the outside network. The monitor interface functions as the interface between the monitor 66 installed outside and the automatic ticket gate apparatus. Also the monitor 66 is provided with a mode-changing switch 60. By the mode changing switch 60 provided in the monitor 66, the mode can be changed for each automatic ticket gate apparatus independently.

Figure 6:
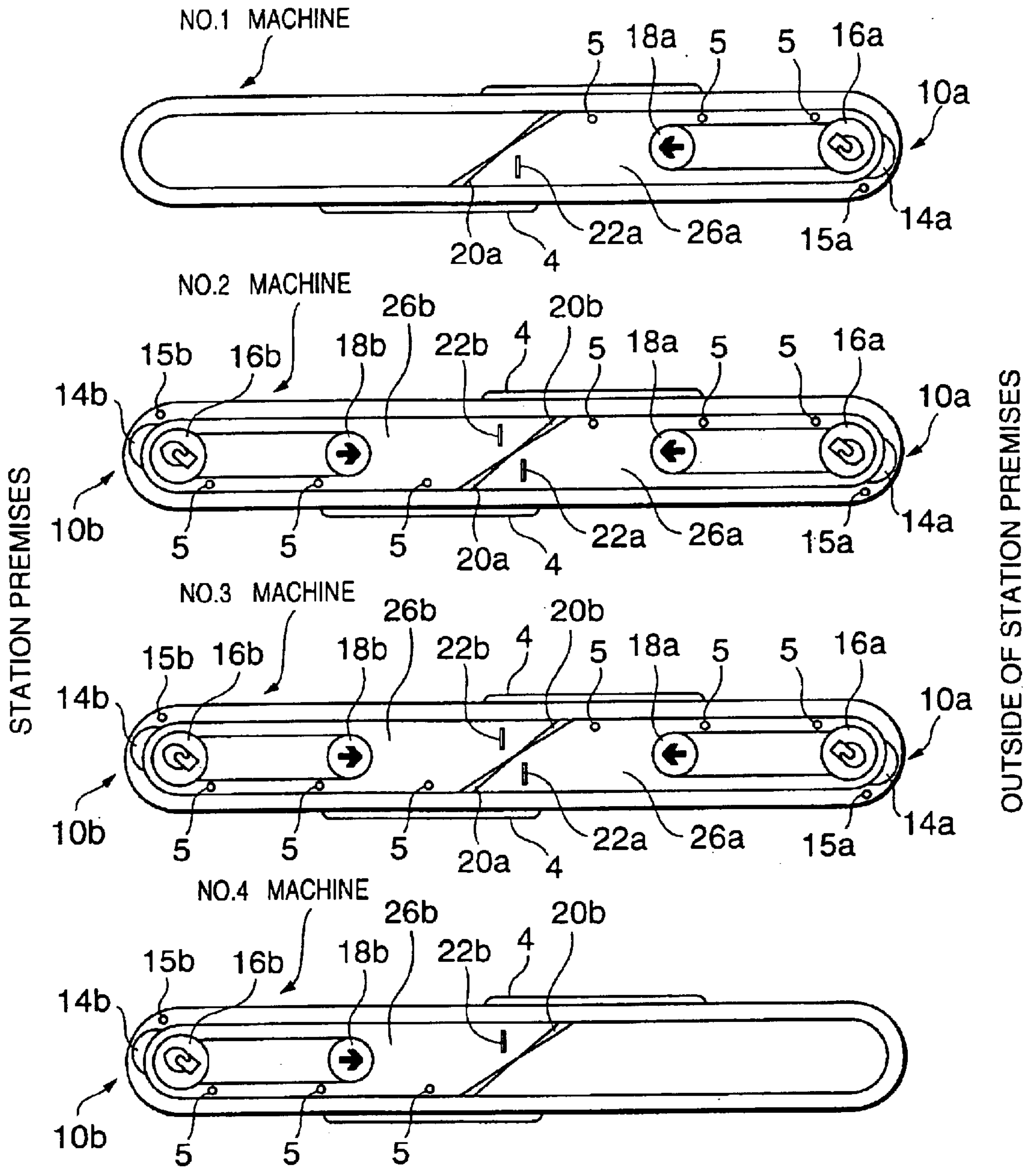
FIG. 6 is a drawing showing an example of the installation of the automatic ticket gat apparatus in accordance with th present invention.

Next, an installation example of the automatic ticket gate apparatus described in the above is described by referring to FIG. 6. As shown in FIG. 6, a plurality of automatic ticket gate apparatus are installed on the boundary between the station premises and outside the station premises. In this case, the space between the respective automatic ticket gate apparatus are the common passages for ticket checking and ticket collecting process. Meantime, for the automatic ticket gate apparatus to be located at the both ends, the ticket gate apparatus provided either with a ticket checking processor or with a ticket collecting processor is installed.

When a user receives a ticket checking process with a magnetic ticket, the user enters into the passage from outside the station premises and inserts a magnetic ticket into the insert port 14*a*. The inserted magnetic ticket is transferred by the conveying mechanism 24*a*, and the data stored in the magnetic ticket are read out by the magnetic head 35 for reader/writer on the way and certain data are stored in the magnetic ticket as the case may be. The main controller 1 performs a judgement as to the propriety of passage basing upon the data read out from the magnetic ticket and the data stored in the fare memory 34. When the passage is permitted, a puncher or a printer processes the magnetic ticket as the case may be, and is delivered at the take-out port 22*a*. In this case, the checking result indicating display 20*a* lights up blue. When the passage is not permitted, the magnetic ticket is delivered as it is at the take-out port 22*a* and at the same time, the passage of the user is prevented by closing the door 4. (The entrance into the station premis s is prohibited.) In this case the checking result indicating display 20*a* lights up red.

When a user receives the ticket checking process with wireless ticket, the user enters into the passage from the outside the station premises and holds up the wireless ticket to the wireless communicator 16*a*. Thereat, the data stored in the wireless ticket is read out by a communication between the wireless ticket and the wireless communicator 16*a* and certain data are written in the wireless ticket as the case may be. The main controller 1 performs a judgment as to the propriety of the passage basing upon the data read out from the wireless ticket and the data stored in the fare memory 34. When the passage is permitted, the checking result indicating display 20*a* lights up blue. When the passage is not permitted, the passage of the user is prevented by closing the door 4. (The entrance into the station premises is prohibited.) In this case the checking result indicating display 20*a* lights up red.

When a user receives a ticket collecting process with a magnetic ticket, the user enters from the inside station premises and inserts the magnetic ticket into the insert port 14*b*. The inserted magnetic ticket is transferred by the conveying mechanism 24*b* and the data stored in the magnetic ticket are read out by the magnetic head 35 for the reader/writer on the way. The main controller 1 performs a judgment as to the propriety of the passage basing upon the data read out from the magnetic ticket and the data stored in the fare memory 34. When the passage is permitted, the magnetic ticket is collected by the ticket collector 7. In this case, the checking result indicating display 20*b* lights up blue. When the passage is not permitted, the magnetic ticket is delivered at the take-out port 22*b* as it is and the passage of the user is prevented by closing the door 4. (The exit to outside the station premises is prohibited.) In this case, the checking result indicating display 20*b* lights up red.

When a user receives a ticket collecting process with a wireless ticket, the user enter into the passage from inside the station premises and holds up the wireless ticket to the wireless communicator 16*b*. In this case, the data stored in the wireless ticket are read out by a communication between the wireless ticket and the wireless communicator 16*b* and certain data are written in the wireless ticket as the case may be. The main controller 1 performs a judgement as to the propriety of the passage basing upon the data read out from the wireless ticket and the data stored in the fare memory 34. When the passage is permitted, the checking result indicating display 20*b* lights up blue. When the passage is not permitted, the passage of the user is prevented by closing the door 4. (The exit to outside the station premises is prohibited.) In this case the checking result indicating display 20*b* lights up red.

When the passage is not permitted, the monitor 68 is informed of the machine number of the automatic ticket gate apparatus, at which passage is rejected.

In this connection, the location of the magnetic head 35 is described. One side of the magnetic ticket is a magnetic recording side, on which the magnetic information is stored and the other side is the printing side, on which information by means of letters is printed. In case of the automatic ticket gate apparatus, the magnetic head 35 is located so that the magnetic ticket can be processed, in any case when the magnetic ticket is inserted with the magnetic recording side up or down.

The first arrangement of the magnetic head 35 is described. According to the first arrangement, a magnetic head 35 for the reader/writer is located along the conveying mechanism 24*a* and 24*b*, for the case that a magnetic ticket is inserted with the magnetic recording side down. Furthermore, a magnetic head 35 for the reader/writer is located along the conveying mechanism 24*a* and 24*b*, for the case that magnetic ticket is inserted with the magnetic recording side up. Thus, both cases that the magnetic tick t is inserted with the magnetic recording side down or up, can be dealt. Meanwhile, at the ticket collecting processor 10*b*, the magnetic head 35 for the writer may be eliminated. (The magnetic head for the writer is not provided.) Especially, for it is not necessary to write data in the magnetic ticket. The magnetic recording side of the magnetic ticket to be collected at the ticket collector 7, may be destroyed by punching by the punching mechanism 49. The constitution of the machine can be simplified by eliminating the magnetic head 35 for the writer at the ticket collecting processor 10*b*.

The second arrangement of the magnetic head is described. In this second arrangement, the magnetic head 35 for the writer is located along the conveying mechanism 24*a* and 24*b* for the case that a magnetic ticket is inserted with a magnetic recording side down. Furthermore, the magnetic head 35 for the writer is located along the conveying mechanism 24*a* and 24*b* for the case that a magnetic ticket is inserted with the magnetic recording side up. With this arrangement, in any case when the magnetic ticket is inserted with the magnetic recording side down or up, the magnetic ticket can be dealt. In the meantime, the magnetic head 35 for the tickets with the magnetic recording side down only is located along the conveying mechanism 24*a* and 24*b*. Furthermore, only with the magnetic head 35 for the case that magnetic tickets are inserted with the magnetic recording side down, the magnetic tickets inserted with the magnetic recording side both down and up can be dealt. There is no problem, when the magnetic ticket is inserted with the magnetic recording side down. When the magnetic ticket is inserted with the magnetic recording side up, the output for the reading out the data becomes weak. This is due to the fact that the magnetic recording side becomes far from the magnetic head and the magnetic output becomes weak because of the influence of space loss. In this case the output current is lower than a specified value, the gain of the reading out amplifier is changed over, and the reading out can be realized by increasing the magnification of the output. Meantime, at the ticket collecting processor 10*b*, the magnetic head 35 for the reader/write can be eliminated, same as in the case of the arrangement 1 of the magnetic head 35. (The magnetic head for the writer is not provided.) The magnetic recording side of the magnetic ticket to be collected by the ticket collector 7, may be destroyed by punching by the punching mechanism 49. The constitution of the machine can be simplified by eliminating the magnetic head for the writer at the ticket collecting processor.

Figure 7:
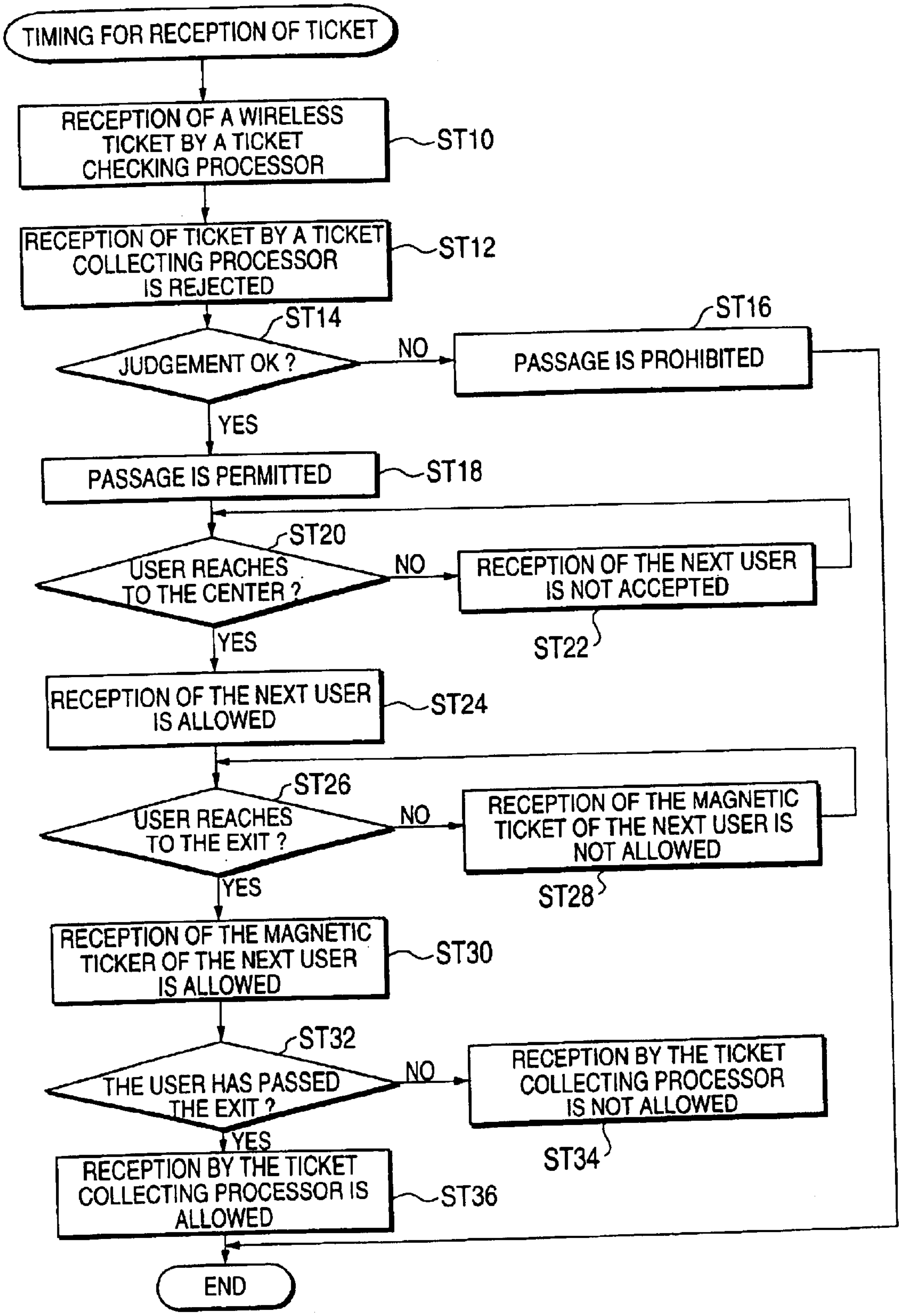
FIG. 7 is a flow chart showing a timing to receive of users by ticket gate apparatus in accordance with the present invention.

Next, the timing to receive th user by th automatic ticket gate apparatus is described by referring to the flowchart shown in FIG. 7. The ticket checking processor 10*a* of the present invention is provided with a take-out port 22*a* in the neighborhood of the center of the ticket checking and collecting passage. For this reason, there is a possibility that a wireless ticket user who has entered in the ticket collecting passage in advance, can take out erroneously the magnetic ticket of the next following user of the magnetic ticket, who comes after into the passage. Therefore, as explained in the following, it is necessary to control the timing to receive the next user.

It is assumed that there are two ticket gate apparatus, No.1 machine and No.2 machine, which are located side by side (Refer to FIG. 6). And the timing for receiving the users who pass through the passage between these No.1 and No.2 machines, is described. In this connection, the ticket checking processor 10*a* of No.1 machine is used to receive the ticket checking process by going through the passage and the ticket collecting processor of No.2 machine is used for receiving the ticket collecting process by going through the passage.

In the condition that no user enters into the passage for ticket checking and collecting processes between No. 1 and No. 2 machines, in other words, in the condition that both the ticket checking processor 10*a* of No.1 machine and the ticket collecting processor 10*b* of No.2 machine are on standby waiting for a user, it is assumed that a user of the wireless ticket (hereinafter called the first user) enters into the passage after the ticket checking process by the ticket checking processor 110*a* of No.1 machine. In other words, the wireless ticket is accepted by the ticket checking processor 10*a*of No. 1 machine (ST10). In this moment, the receipt of the ticket collecting process by the ticket collecting processor 10*b* of No.2 machine is prohibited (ST12), and, for example, a guidance for entrance prohibition and a like is displayed at the passage display 12*b* of No.2 machine.

When the passage of the first user with a wireless ticket is not permitted at the ticket checking process by means of the ticket checking processor 10*a* (ST14, NO), the passage through the ticket collecting passage is prevented by closing the door (ST16). In case that the passage is permitted with the wireless ticket (ST14, YES), the passage through the ticket collecting passage is permitted while the door is open (ST18).

Thereafter, the passage state of the first user is recognized basing upon the output from the human sensor 5, and the timing for receiving the next user is controlled, basing upon the passage state of the first user. For example, until the first user reaches the center of No.1 machine (ST20 NO), the next user is not received at all (ST22). In other words, neither a magnetic ticket nor a wireless ticket of the next user is received. Accordingly, the insertion of the magnetic ticket into the insert port 12*a* is prohibited, while the shutter 37 of the ticket insert port 12*a* is closed. In this case, the guidance for the entrance prohibition is displayed at the passage display 12*a*. When it is ascertained that the first user reaches the center of No.1 machine (ST20, YES), only the wireless ticket of the next user is permitted to receive (ST24). In this case, the guidance such as entrance prohibition of the user with a magnetic ticket is displayed at the passage display 12*a* of No. 1 machine.

Until the first user reaches the exit of No.1 machine ST26, NO), the magnetic ticket of the next user is not received (ST28). When it is ascertained that the first user has reached to the exit of the No.1 machine (ST26, YES), the receipt of the magnetic ticket of the next user is permitted (ST30). At this moment, the shutter 37 is opened and the insertion of the magnetic ticket into the insert port 12*a* is permitted.

Until the first user has passed through the exit of No.1 machine (ST32, NO), the receipt by the ticket collecting process by means of the ticket collecting processor 10*b* of No.2 machine is kept prohibited (ST 34). When it is ascertained that the first user has passed through the exit of No.1 machine (ST32, YES), the receipt by the ticket collecting process by means of the ticket collecting processor 10*b* of No.2 machine is permitted (ST36). At this moment, the guidance for the entrance prohibition at the passage display of No.2 machine is cleared.

As described in the above, in case that next user is the user of the wireless ticket, the receipt of the ticket is permitted earlier than the case that the next: user is the user of the magnetic ticket. This is due to the fact that the foregoing user never takes out erroneously the ticket of the next user erroneously, when the next user is a user of a wireless ticket. Therefore, at the timing that the necessary data are dispatched to the wireless ticket and the recording is finished, after the wireless communication is made with the wireless ticket of the foregoing user and a judgment for the passage is made, the receipt of the wireless ticket of the next user is permitted. When the next user is the user of a magnetic ticket, the receipt of the ticket is permitted, after it is detected that the foregoing user (the user of the wireless ticket) has passed through the center of the automatic ticket gate apparatus and has reached to the exit.

As the receipt of the next user can be made quicker, when only the users of wireless ticket are processed by means of the timing control as described in the above, the utilization efficiency of the automatic ticket gate apparatus is increased. In other words, the utilization efficiency can be increased by operating the automatic ticket gate apparatus in a changed mode as follows.

As described in the above, the automatic ticket gate apparatus is provided with a mode changing switch 60. Similarly, the monitor 68 is provided with a mode changing switch 68. The mode-changing switch provided in the monitor 68 could change the mode of each machine. This mode changing switch 60 changes the mode among a exclusive magnetic ticket mode, an exclusive wireless ticket mode and a combination mode.

When the operating mode is changed to the exclusive magnetic mode by the mode changing switch 60, the object of the ticket checking and collecting processors of the automatic ticket gate apparatus become only magnetic tickets. In this case, it is displayed on the displays 12*a* and 12*b*, that the magnetic tickets only are the objects of the process. In such a case, even with an effective wireless ticket, the passage is not permitted. When the operation mode is changed to the exclusive wireless mode by the mode-changing switch 60, the object of the ticket checking and collecting process by the automatic ticket gate apparatus becomes only wir less ticket. In this case, it is displayed on the passage displays 12*a* and 12*b*, that the wireless tickets only are the objects of the process. In this case, the passage is not permitted even with an affective wireless ticket. When the mode is changed to the exclusive wireless ticket mode by means of the mode changing switch 60, the objects of the ticket checking and collecting processors become wireless tickets only. In this case, the passage displays 12*a* and 12*b* display that wireless tickets only are the objects of the process. Furthermore, the shutters of the ticket insert ports 14*a* and 14*b* are closed, and the magnetic tickets cannot be inserted. When the operating mode is switched into the combination mode, the object of the ticket checking and collection processors becomes both magnetic tickets and wireless tickets. In this case, it is displayed on the passage displays 12*a* and 12*b* that both magnetic tickets and wireless tickets are object of the processing.

For example, a station is assumed where a plurality of automatic ticket gate apparatus are provided and a plurality of the passages for ticket checking and collecting are provided. In such a station, at the rush hour in the morning and in the evening, most of the automatic ticket gate apparatus are operated in the exclusiv wireless mode. The remaining automatic ticket gate apparatus are operated in the exclusive magnetic ticket mode or in the combination mode. At the rush hour in the morning and in the evening, most of the users are pass users. In the operation of this automatic ticket gate apparatus, all the passes are allocated to the wireless tickets. In other words, by operating the most of automatic ticket gate apparatus in the exclusive wireless mode in the rush-hour in the morning and in the evening, when many users of the pass concentrate, the processing efficiency per a automatic ticket gate apparatus can be increased, so that as the result, the crowdedness of the ticket processing can be relieved. This is an example and in other cases, by changing the operating mode depending on time range or day of the week and a like, the processing efficiency of the ticket checking and collecting process can be increased.

As described in the above, the automatic ticket gate apparatus of the present invention are able to handle both magnetic tickets and wireless tickets. Therefore, the automatic ticket gate apparatus are provided with a processor for handling magnetic tickets and a processor for handling wireless tickets. When either one is out of order, in other words, when either one of the magnetic tickets handling process and the wireless ticket handling process becomes unable to process, the apparatus can be operated by changing operating mode as described in the above. The changing of the operating mode can be executed by a maintenance staff-member, or can be performed automatically by the machine itself by detecting the trouble situation. By such an arrangement, the ticket checking and collecting process with wireless tickets is still possible, even when magnetic tickets cannot be processed. On the contrary, even when wireless tickets cannot be processed, the ticket checking and collecting processes with magnetic tickets are still possible.

Figure 8:
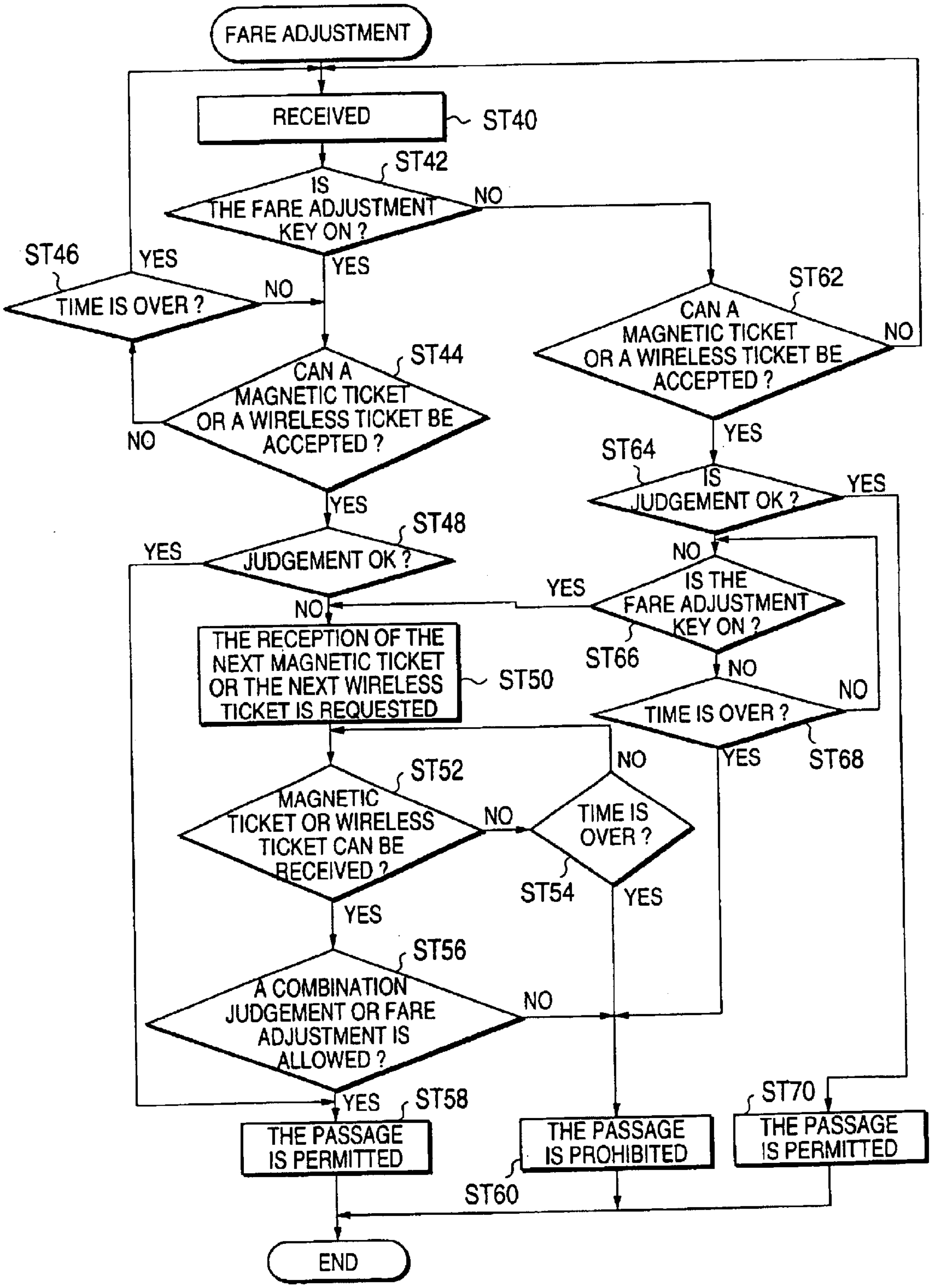
FIG. 8 is a flow chart showing a fare adjustment by ticket gate apparatus in accordance with the present invention.

Next, fare adjustment by means of the automatic ticket gate apparatus of the invention is described by referring to the flow chart shown in FIG. 8. The automatic ticket gate apparatus are provided with a fare adjustment keys 15*a* and 15*b* and the adjustment of the fare becomes possible by pushing down the adjustment key 15*a*. The timing for the pushing down the adjustment key 15*a* may be either before the first ticket is processed or after the said ticket is processed. Meantime, it can be so arranged that the guidance displays 18*a* and 18*b* are designed as touch panels so that the adjustment keys may be displayed on the guidance displays 18*a* and 18*b*. Also it is possible to have the automatic ticket gate apparatus not provided with an adjustment key, but to have the said mechanism to judge the propriety of the fare adjustment and to request fare adjustment.

At first, the case that fare adjustment key is pushed down before the first ticket is processed, is described. When the automatic ticket gate apparatus receives both a magnetic ticket and a wireless ticket (ST40), the fare adjustment key 15*a* or 15*b* is pushed down (ST42, YES). In other words, when the user knows that he is not permitted for the passage for ticket checking or collecting process with a magnetic ticket or a wireless ticket only that he has, it happens that the fare adjustment key 15*a* or 15*b* is pushed down before the ticket is received. Of course, when the user has not another magnetic ticket or another wireless ticker, he may not execute fare adjustment.

When the magnetic ticket or the wireless ticket is not received within a certain time (ST44, NO), after the fare adjustment key 15*a* or 15*b* is pushed down (ST42, YES), time is over (ST46, YES) and the process returns to the beginning. When a magnetic ticket or a wireless ticket is received within a certain time (ST44, YES), the process for judging the passage is performed basing upon the received ticket (ST44, YES). When the judgement is right OK (ST48, YES), the passage is permitted (ST58). In this moment, a guidance such as "fare adjustment is not necessary", or "you may pass through without adjustment" is displayed on the checking result indicating display 20*a* or 20*b*. In case that the checking result is negative (ST 48, NO), the next magnetic ticket or the wireless ticket is requested for the fare adjustment (ST50). In this case, the guidance such as "a magnetic ticket should be inserted into the insert port or "a wireless ticket shall be held to the wireless communicator" is displayed on the guidance display 18*a* or 18*b*. Meantime, when the first ticket is a magnetic ticket, this first magnetic ticket is held at the holding mechanism 51 and is subject to a combined judgment and a fare adjustment.

When a magnetic ticket or a wireless ticket for a fare adjustment is not received within a certain time (ST52, NO), though a magnetic ticket or a wireless ticket for the fare adjustment (ST50) is requested, time is over (ST54, YES), the door is closed and the passage is prevented (ST60). Then, when the first ticket is a magnetic ticket, it is returned. In this case, the guidance such as "you shall repeat the process from the. beginning" and a like is displayed on the guidance display 18*a* or 18*b*. When a magnetic ticket or a wireless ticket is received within a certain time (ST52, YES), a combined judgment or a fare adjustment is performed (ST56). In case that the combined judgment of the first ticket and the second ticket is acceptable (ST56, YES), the passage is permitted (ST58). Also, when either one of the first ticket and the second ticket is a ticket, with which fare adjustment is allow d (such as SF card in which the sum for fare adjustment is not short), the fare adjustment is performed and then the passage is permitted (ST58). Also, in case of the above combined judgement or fare adjustment, the ticket is recorded with a specified data. When the combined judgment is negative and the fare adjustment cannot be performed (ST56, NO), the door is closed and the passage is prohibited (ST60).

Next, the case that the fare adjustment key is pushed down after the first ticket is processed, is described. When the automatic ticket gate apparatus receives both a magnetic ticket and a wireless ticket (ST40), either the magnetic ticket or the wireless ticket is received, without pressing the fare adjustment key 15*a* or 15*b* (ST42, NO) down, the passage checking process is performed basing upon the received ticket (ST 64). When the checking result is acceptable (OK) (ST64, YES), the passage is permitted (ST 58). When the checking result is negative (NG), the passage is prohibited by closing the door and the guidance indicating display 18*a* or 18*b* indicates the guidance such as "Please push down the fare adjustment key, when the fare adjustment is requested", and a like. If the fare adjustment key 15*a* or 15*b* is not pushed down within a certain time (ST66, NO), time is over (ST68, YES), the process is finished while the passage is prohibited (ST60). In this case, when the first ticket is a magnetic ticket, this magnetic ticket is returned. When the fare adjustment key 15*a* or 15*b* is pushed down within a certain time (ST66, YES), the next magnetic ticket or the wireless ticket for the fare adjustment is requested (ST50). In this case, the guidance display indicates a guidance such as "Please insert a magnetic ticket into the insert port or hold up a wireless ticket to the wireless communicator" and a like. Meantime, when the first ticket is a magnetic ticket, this magnetic ticket is held at the holding mechanism 51, and the combined judgment and the fare adjustment shall be awaited.

When a magnetic ticket or a wireless ticket for the fare adjustment is not received within a certain time (ST52, NO), though a magnetic ticket or a wireless ticket for the fare adjustment (ST50) is requested, time is over (ST 54, YES) and the door is closed and the passage is prohibited. And then the first ticket is returned, when it is a magnetic ticket. In this case, The guidance display 18*a* or 18*b* indicates a guidance such as "please repeat the process from the beginning" and a like. When a magnetic ticket or a wireless ticket is received within a certain time (ST52, YES), a combined judgement or a fare adjustment is performed (ST 56). When the combined judgment for the first ticket and the second ticket is acceptable (OK) (ST56, YES), the passage is permitted (ST58). When either ticket is an adjustable ticket (a ticket such as SF card, which is not short of the sum for fare adjustment), the fare adjustment is performed and the passage is permitted (ST58). Also in case of a combined judgement or a fare adjustment, a specified data is recorded in the ticket as the case may be. In case that the combined judgement is negative and the fare adjustment cannot be performed (ST56, NO), the door is closed and the passage is prohibited (ST 60).

In this connection, the effectiveness of the automatic ticket gate apparatus of the present invention is concluded as follows:

(1) The magnetic tickets for the automatic ticket gate apparatus is limited to one size only. For example, the ticket size is limited to Edomondson size smaller than the size for the season tickets or passes. Besides the above, the wireless tickets for the automatic ticket gate apparatus shall cover all the other kinds of tickets, which sizes are different from the one size for the magnetic ticket. By means of such an arrangement, it is not necessary to have the automatic ticket gate apparatus provided with a coordinating portion for a plurality of the sizes for magnetic tickets. Furthermore, the size of the holding mechanism in the automatic ticket gat apparatus can be made compact (it is no more necessary to have the apparatus met the size of season tickets (passes)), and the distance between the magnetic heads can be made short (same as in the above, it is no more necessary to have the apparatus meet the size of season tickets (passes)). As the result, the ticket gate apparatus can be made compact, which results in cost down. Especially, the length in the conveying direction can be made short.

(2) As the length of the machine in the conveying directions can be made short, as described in the above, the ticket checking processor 10*a* and the ticket collecting processor 10*b* can be installed in a series along the passage for checking and collecting tickets without extending the passage for ticket checking and collecting. In other words, it is not necessary to install the both machines in parallel along the passage for ticket checking and collecting.

(3) As described in the above, the sizes of the magnetic tickets are limited and at the same time the functions of the tickets are limited. For example, the magnetic tickets are limited to the one-day tickets for short distances only. As it is not necessary to return the inserted magnetic tickets at the ticket collecting processor (10) by this way, it is not necessary to provide the take-out port. As the result, the machine can be made simple and the cost can be reduced.

(4) By limiting the magnetic head for the reader for one-way (only in the direction corresponding to one side of the magnetic ticket) in case of the automatic ticket gate apparatus of the present invention, the machine can be simplified and the cost can be reduced.

(5) The automatic ticket gate apparatus of the present invention can be operated either in an exclusive magnetic ticket mode, in an exclusive wireless ticket mode, or in a combined mode by changing the mode with mode changing switch. By such an arrangement, a proper mode can be selected depending upon the situation, so that the operating efficiency can be increased.

For example, a station is assumed where a plurality of the automatic ticket gate apparatus are installed and a plurality of passage for ticket checking and collecting passages are provided. In such a station, in the rush hour in the morning and in the evening, most automatic ticket gate apparatus are operated in an exclusive wireless ticket mode. The remaining ticket gate apparatus are operated in an exclusive magnetic mode or in a combined mode. In the rush hour in the morning and evening, most of the users are the users of season tickets. In the operation of the automatic ticket gate apparatus, all the season tickets are allocated to the wireless tickets. In other words, as the processing efficiency can be increased by having the most of the automatic ticket gate apparatus operated in the exclusive wireless mode in the rush-hour in the morning and evening, when most of the users are the pass-users, the crowdedness due to the ticket checking and collecting process can be relieved. Also, when it becomes impossible to process either the magnetic tickets or the wireless tickets, the machine can be operated by changing the operating mode as described in the above.

Furthermore, as the automatic ticket gate apparatus is provided with a display indicating the applied operating mode, the users may utilize the machine without confusion.

(6) The ticket gate apparatus of the present invention are able to perform the fare adjustment process in case of any combination of the magnetic tickets and the wireless tickets.

(7) As the top covers as the communicating faces of the automatic ticket gate apparatus are inclined to the respective passages, the users can hold up the wireless ticket to the wireless communicators in a natural posture. Similarly, the user can recognize the content of the display indicated on the guidance display in a natural posture.

(8) In case of the automatic ticket gate apparatus of the present invention, the checking result indicating display is provided on the portion protruding over the top cover, the display of the checking result indicating display can be easily recognized. Also, the checking result indicating result protrudes over the top cover, it is prevented that a wireless ticket held up to one wireless communicator is held up to the other wireless communicator.

(9) In case of the automatic ticket gate apparatus of the present invention, the magnetic ticket is delivered with one side of the ticket parallel to the top cover, it is possible to have the passerby take out the magnetic ticket without forcing the passerby to take a unnatural posture.

In accordance with the present invention, the space for the installation can be reduced remarkably, and the ticket gate apparatus, which is able to perform the ticket checking process easily (easy to hold up the wireless ticket to the wireless communicator, easy to recognize the checking result indicating display, easy to take out the delivered magnetic ticket and so on), can be provided.

What is claimed is:

1. An automatic ticket gate apparatus comprising:

a main body having a first side to define a first passage and a second side to define a second passage;

a first top cover which is provided on a top face of the main body and provided from an entrance portion of the first passage to a central portion of the main body, the first top cover being inclined downwardly from the second passage side to the first passage side;

a first wireless communicator provided on the inclined first top cover which communicates with a wireless ticket;

first checking means for checking propriety of passing through the first passage based upon the result of the communication with the wireless ticket through the first wireless communicator;

a second top cover which is provided on a top face of the main body and provided from an entrance portion of the second passage to the central portion of the main body, the second top cover being inclined downwardly from the first passage side to the second passage side;

a second wireless communicator provided on the inclined second top cover which communicates with a wireless ticket; and second checking means for checking propriety of passing through the second passage based upon the result of the communication with the wireless ticket through the second wireless communicator; and first and second display units to display results obtained from the first and second checking means respectively wherein the display units are provided at a central portion of the main body where the first and second top covers define a boundary portion.

2. An automatic ticket gate apparatus according to claim 1, wherein the first display unit is provided on the side which supports the second top cover and protrudes against the first top cover, for displaying the ticket checking result of the first checking means; and the second display unit is provided on the side which supports the first top cover and protrudes against the second top cover, for displaying the ticket checking result occurred by the second checking means.

3. An automatic ticket gate apparatus according to claim 1 further comprising:

a first insert port provided on the main body to receive a generally rectangular shaped magnetic ticket;

first conveying means for conveying the magnetic ticket from the vicinity of one side of the main body to the center along the first passage;

first reading means for reading data recorded on the magnetic ticket transferred by the first conveying means;

first delivery means provided on the first top cover for delivering the magnetic ticket which is transferred by the first conveying means, with a longitudinal side of the magnetic ticket parallel to the inclined first top cover;

wherein the first checking means executes the ticket checking process basing upon the result of communication with the wireless ticket through the first wireless communicator or basing upon the data read out from the magnetic ticket by means of the first reading means;

a second insert port provided on the main body to receive a generally rectangular shaped magnetic ticket;

second conveying means for conveying the magnetic ticket from the vicinity of the other side of the main body to the center along the second passage;

second reading means for reading data recorded on the magnetic ticket transferred by the second conveying means; and second delivery means provided on the second top cover for delivering the magnetic ticket which is transferred by the second conveying means, with a longitudinal side of the magnetic ticket parallel to the inclined second top cover;

wherein the second checking means executes the ticket checking process basing upon the result of communication with the wireless ticket through the second wireless communicator or basing upon the data read out from the magnetic ticket by means of the second reading means.

4. An automatic ticket gate apparatus according to claim 3, wherein the first display unit is provided on the side which supports the second top cover and portrudes against the first top cover, for displaying the ticket checking result occured by the first checking means, and the second display unit is provided on the side which supports the first top cover and portrudes against the second top cover, for displaying the ticket checking result occured by the second checking ticket means.

5. An automatic ticket gate apparatus according to claim 1 further comprising:

a first insert port provided on the main body to receive a generally rectangular shaped magnetic ticket;

first conveying means for conveying the magnetic ticket from the vicinity of one side of the main body to the center along the first passage;

first reading means for reading data recorded on the magnetic ticket transferred by the first conveying means;

first delivery means provided on the first top cover for delivering the magnetic ticket which is transferred by the first conveying means, with a longitudinal side of the magnetic ticket nonparallel to the inclined first top cover;

wherein the first checking means executes the ticket checking process basing upon the result of communication with the wireless ticket through the first wireless communicator or basing upon the data read out from the magnetic ticket by means of the first reading means;

a second insert port provided on the main body to receive a generally rectangular shaped magnetic ticket;

second conveying means for conveying the magnetic ticket from the vicinity of the other side of the main body to the center along the second passage;

second reading means for reading data recorded on the magnetic ticket transferred by the second conveying means;

second delivery means provided on the second top cover for delivering the magnetic ticket which is transferred by the second conveying means, with a longitudinal side of the magnetic ticket non-parallel to the inclined second top cover;

wherein the second checking means executes the ticket checking process basing upon the result of communication with the wireless ticket through the second wireless communicator or basing upon the data read out from the magnetic ticket by means of the second reading means.

6. An automatic ticket gate apparatus according to claim 5 wherein the first display unit is provided on the side which supports the second top cover and protrudes against the first top cover, for displaying the ticket checking result occurred by the first checking means; and the second display unit is provided on the side which supports the first top cover and protrudes against the second top cover, for displaying the ticket checking result occurred by the second checking means.

* * * * *